(12) United States Patent
Kim (10) Patent No.: US 7,206,106 B2
(45) Date of Patent: Apr. 17, 2007

(54) HOLOGRAPHIC ROM READER HAVING SERVO CONTROL

(75) Inventor: Kun Yul Kim, Seoul (KR)

(73) Assignee: Daewoo Electronics Corporation, Seoul (KR)

( * ) Notice: Subject to any disclaimer, the term of this patent is extended or adjusted under 35 U.S.C. 154(b) by 198 days.

(21) Appl. No.: 11/114,017

(22) Filed: Apr. 26, 2005

(65) Prior Publication Data

US 2005/0249096 A1    Nov. 10, 2005

(30) Foreign Application Priority Data

May 6, 2004    (KR)    ...................... 10-2004-0031748

(51) Int. Cl.
*G08H 1/02*    (2006.01)
*G11B 7/00*    (2006.01)

(52) U.S. Cl. .............................. 359/15; 359/3; 369/43; 369/44.37; 369/103; 369/112.1; 369/112.15; 365/125

(58) Field of Classification Search ................ 340/907, 340/525; 369/112.15, 103; 365/125; 359/3, 359/15

See application file for complete search history.

(56) References Cited

U.S. PATENT DOCUMENTS 6,373,793 B1 *    4/2002    Sasaki et al. .............. 369/30.1

6,987,615 B2 *    1/2006    Shiono et al. .............. 359/569
2004/0212859 A1 *    10/2004    Tsukagoshi .................. 359/15

FOREIGN PATENT DOCUMENTS

KR    10-2004-0025921    3/2004
KR    10-2004-0047525    6/2004

* cited by examiner

*Primary Examiner*—Donnie L. Crosland
(74) *Attorney, Agent, or Firm*—Bacon & Thomas, PLLC (57) ABSTRACT

A holographic ROM reader having a servo control is disclosed. The holographic ROM reader includes an objective lens for focusing light reflected from a storage medium, a pinhole plate provided with a pinhole, a diffraction grating, embedded into the pinhole of the pinhole plate, for diffracting the light focused by the objective lens to produce $0^{th}$ order diffracted light, $+1^{st}$ order diffracted light and $-1^{st}$ order diffracted light therethrough, a photo detector for detecting the amounts of the $0^{th}$ order, the $+1^{st}$ order and the $-1^{st}$ order diffracted light, and a servo controller for comparing an amount of light of an overlapped area of the $0^{th}$ order diffracted light and the $+1^{st}$ order diffracted light with an amount of light of an overlapped area of the $0^{th}$ order diffracted light and the $-1^{st}$ order diffracted light to control the position of the objective lens to pass the light through a center of the diffraction grating if the amounts of light are not identical to each other.

11 Claims, 7 Drawing Sheets

HOLOGRAPHIC ROM READER HAVING SERVO CONTROL

FIELD OF THE INVENTION

The present invention relates to a holographic read only memory reader; and more particularly, to a holographic read only memory reader having a servo control.

BACKGROUND OF THE INVENTION

With the development of information industry, a large capacity storage device and data processing in high speed are required. Of devices for recording digital data, widely known holographic Read Only Memory (ROM) can store a large volume of information on each area corresponding to one bit of a storage medium, such as a Compact Disk (CD) and a Digital Versatile Disk (DVD), and has a high input and output speed because it processes data in parallel. Due to these advantages, the holographic ROM attracts attention as a future large capacity storage device.

Meanwhile, an optical disk system such as a typical CD or DVD system employs a tracking servo and a focusing servo to condense light into track-sized light and detect signal light reflected by a data track of an optical disk such as CD or DVD. More specifically, the tracking servo functions to control the position of condensed light in the radial direction of the optical disk to place the condensed light exactly within the data track of the optical disk, and the focusing servo controls the focal position of light in an optical axis direction to focus the light exactly on the reflection surface of the optical disk.

In contrast, a holographic ROM reader employing the holographic ROM irradiates reference light onto a disk shaped holographic storage medium. In this case, the size of the reference light is far larger than that of data track of the holographic storage medium being rotated, so that it is not necessary for the holographic ROM reader to exactly control the position of the reference light in the radial direction. That is, even though some run-out occurs in the radial direction during the rotation of the holographic storage medium, a desired data track is positioned within the irradiated reference light, so that the holographic ROM reader does not require the tracking servo as used in the optical disk system. In addition, the focusing depth of the reference light having a large diameter is large (for example, the focusing depth of 100 μm diameter light is about 4.7 mm). Accordingly, the data track of the storage medium is located within the focusing depth of the reference light even though some run-out occurs in the optical axis direction during the rotation of the storage medium, and therefore, the focusing servo is not required in the holographic ROM reader, unlike the optical disk system.

Therefore, the operation of the tracking and focusing servos for the holographic ROM reader is merely to pass signal light, which is reflected from the data pit of tracks on a storage medium, exactly through the pinhole of a pinhole plate, unlike the optical disk system. However, the size of the pinhole is same as that of the track pitch of the storage medium, so that it is difficult for the signal light formed by the data pit of a specific track to be incident exactly on the pinhole of the pinhole plate due to run-out in a radial direction or an optical axis direction that is caused by the rotation of the storage medium. Accordingly, the servo control for the holographic ROM reader should detect the signal light passed through the pinhole and control the signal light so that the signal light passes exactly through the pinhole based on detected result.

Figure 1:
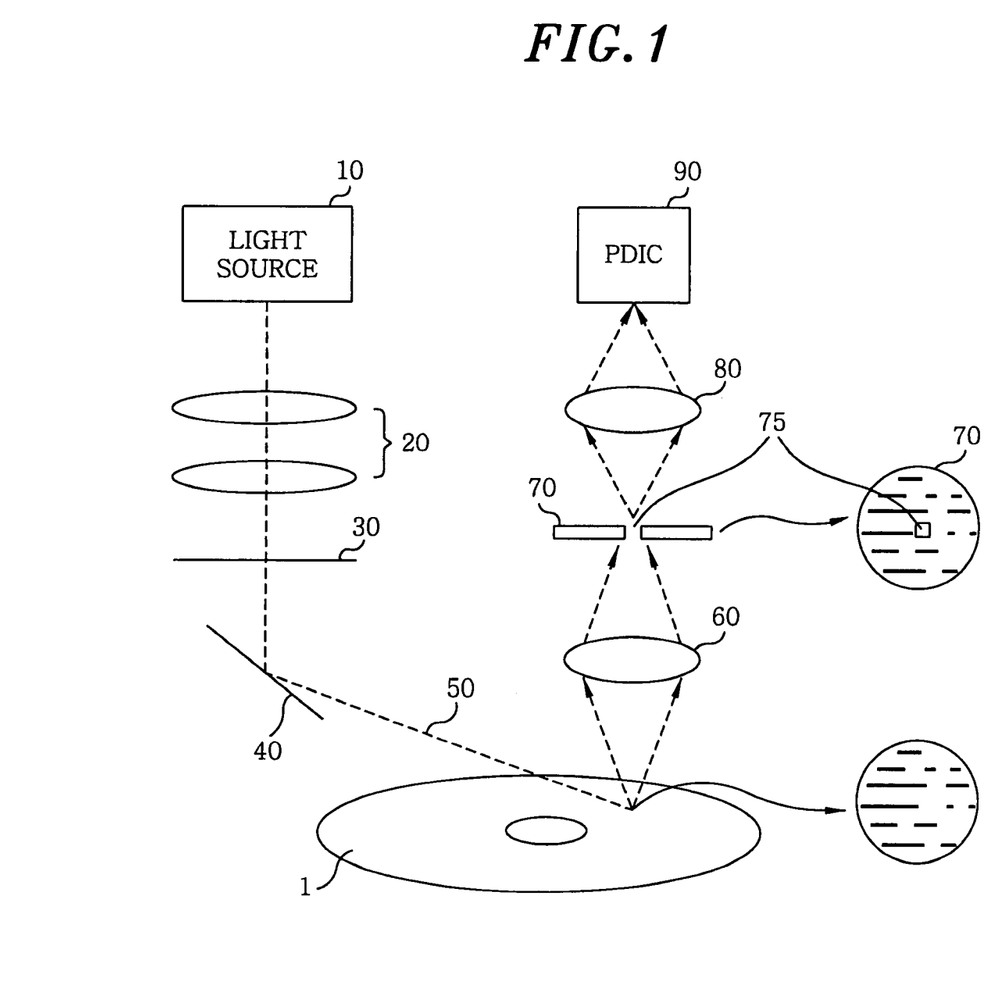
FIG. 1 is a schematic diagram showing a conventional holographic ROM reader.

FIG. 1 is a schematic diagram showing a conventional holographic ROM reader. The conventional holographic ROM reader includes a reflection mirror 40 for allowing reference light, which is generated by a light source 10, to be incident on a storage medium 1 at a preset angle by reflecting the reference light, a pinhole plate 70 for passing only part of signal light having a diameter (corresponding to a one-bit data), which is diffracted from the storage medium 1, through the pinhole 75 thereof, and a Photo Detector Integrated Circuit (PDIC) 90 for detecting the signal light incident through the pinhole 75 in the pinhole plate 70.

The holographic ROM reader further includes a reducer 20 for transforming light between the light source 10 and the reflection mirror 40, and an aperture plate 30 for irradiating light, which is passed through the reducer 20, onto the reflection mirror 40 through the aperture thereof. In addition, an objective lens 60 is placed between the storage medium 1 and the pinhole plate 70 to condense the signal light from the storage medium into the pinhole 75, and a condenser lens 80 is provided between the pinhole plate 70 and the PDIC 90 to focus the light passed through the pinhole 75 in the pinhole plate 70.

The operation of the conventional holographic ROM reader will be described as follows. Laser light generated by the light source 10 is incident on the reflection mirror 40 through the reducer 20 and the aperture plate 30. The reflecting mirror 40 reflects the reference light, which corresponds to the phase-conjugate wave of reference light used at the time of recording data on the storage medium 1, onto the storage medium 1 at an incident angle identical to that at which light was incident on the storage medium 1.

The reference light incident on the storage medium 1 is diffracted through a recording material layer of the storage medium 1 to be signal light. The diffracted signal light is then focused on the pinhole plate 70 by the objective lens 60. In this case, the diameter of the reference light incident on the storage medium 1 is about 100 μm, so that the signal light, which is diffracted from the storage medium 1 and is focused through the objective lens 60, carries data reproduced from several tracks of the storage medium 1. The signal light is passed through the pinhole 75 of the pinhole plate 70, is condensed by the condenser lens 80, and is then transmitted to the PDIC 90. In this case, the pinhole 75 in the pinhole plate 70 has a size corresponding to the track pitch of the storage medium 1, that is, a one-bit data size, so that only part of the signal light (corresponding to the data bit of a track) is passed through the pinhole 75 and is condensed onto the PDIC 90 through the condenser lens 80.

The PDIC 90 detects the amount of the signal light. However, the conventional holographic ROM reader is problematic in that it is difficult to precisely determine whether the signal light has passed through the center of the pinhole 75 in the pinhole plate 70 or through the side of the pinhole 75, based on the amount of light measured by the PDIC 90. Accordingly, the conventional holographic ROM reader cannot perform a precise control to allow the signal light to pass through the center of the pinhole in the pinhole plate.

SUMMARY OF THE INVENTION

It is, therefore, an object of the present invention to provide a holographic ROM reader for performing a servo control so that reproduced signal light is incident exactly on the center of the pinhole in a pinhole plate by employing a diffraction grating having a land and a groove.

In accordance with the present invention, there is provided a holographic ROM reader including: an objective lens for focusing light irradiated on a storage medium from a light source and then diffracted by the storage medium; a pinhole plate provided with a pinhole having a size that allows part of the light, which is focused by the objective lens, to pass through the pinhole; a transmissive diffraction grating, embedded into the pinhole of the pinhole plate, for diffracting the light focused by the objective lens to produce 0th-order diffracted light, +1st-order diffracted light and −1st-order diffracted light therethrough; a photo detector for detecting the 0th-order diffracted light, the +1st-order diffracted light and the −1st-order diffracted light; and a servo controller for comparing the amount of light of the overlapped area of the 0th-order diffracted light and the +1st-order diffracted light with the amount of light of the overlapped area of the 0th-order diffracted light and the −1st-order diffracted light, and performing servo control to pass the light through the center of the transmissive diffraction grating if the amounts of light are not identical to each other.

In accordance with the present invention, there is provided a holographic ROM reader including: an objective lens for focusing light irradiated onto a storage medium from a light source and then diffracted by the storage medium; a pinhole plate provided with a pinhole having a size that allows part of light, which is focused by the objective lens, to pass through the pinhole; a reflective diffraction grating, embedded into the pinhole of the pinhole plate, for diffract the light that is focused by the objective lens to produce 0th-order diffracted light, +1st-order diffracted light and −1st-order diffracted light reflected therefrom; a photo detector for detecting the 0th-order diffracted light, the +1st-order diffracted light and the −1st-order diffracted light that are reflected by the reflective diffraction grating; and a servo controller for comparing the amount of light of the overlapped area of the 0th-order diffracted light and the +1st-order diffracted light with the amount of light of the overlapped area of the 0th-order diffracted light and the −1st-order diffracted light, and performing servo control to pass the light through the center of the reflective diffraction grating if the amounts of light are not identical to each other.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Preferred embodiments of the present invention will now be described in detail with reference to the accompanying drawings, wherein like parts appearing in figures are represented by like reference numerals.

Figure 2:
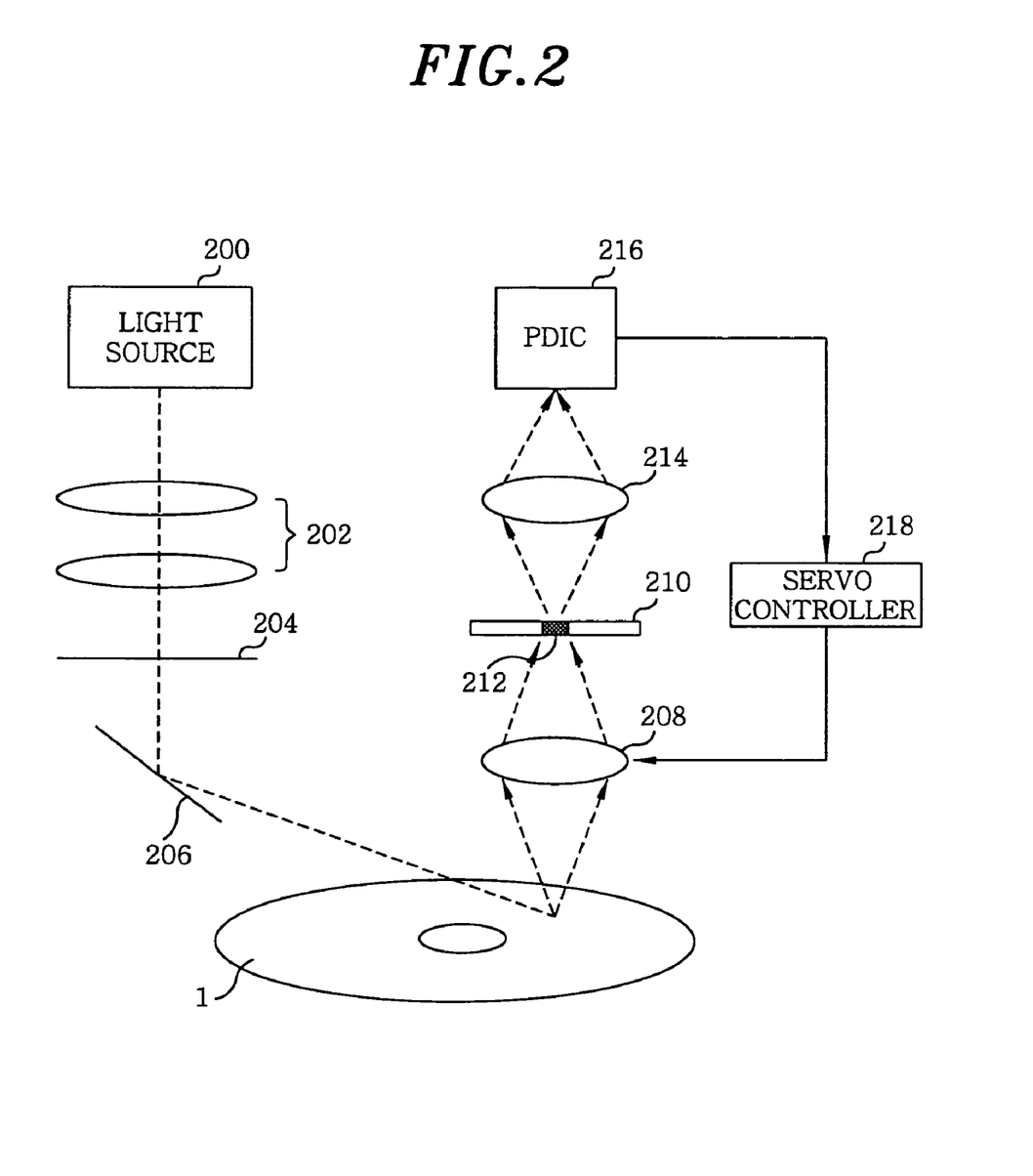
FIG. 2 is a configuration diagram showing a holographic ROM reader according to the present invention.

Referring to FIG. 2, there is shown a configuration diagram showing a holographic ROM reader according to an embodiment of the present invention.

As shown in FIG. 2, the holographic ROM reader according to an embodiment of the present invention includes a light source 200, a reflection mirror 206 for allowing laser light, which is generated by the light source 200, to be incident on the storage medium 1 at a preset angle by reflecting the reference light, a pinhole plate 210 having a pinhole through which only part of signal light (having a diameter corresponding to a one-bit data), which is reproduced from the storage medium 1, and a diffraction grating 212 embedded into the place of the pinhole in the pinhole plate 210 and provided with a land and a groove, a photo detector 216 for detecting the amounts of 0th-order diffracted light, +1st-order diffracted light and −1st-order diffracted light generated through the diffraction grating 212, and a servo controller 100 for performing servo control based on the amounts detected through the photo detector 216.

The photo detector 216 includes a two-segmented sensor formed of a photo diode which may be implemented as an Integrated Circuit (referred to as a PDIC). The servo controller 100, in response to the amounts of light detected by the photo detector 216, performs servo control to control the position of the objective lens 208 or the pinhole plate 210 using a push-pull method so that the signal light reproduced from the storage medium 1 exactly passes through the center of the diffraction grating 212.

An objective lens 208 is placed between the storage medium 1 and the pinhole plate 210 to focus the signal light on the diffraction grating 212 of the pinhole plate 210, and a condenser lens 214 is provided between the pinhole plate 210 and the PDIC 216 to condense the signal light passed through the diffraction grating 212 provided in the pinhole plate 210.

In addition, the holographic ROM reader further includes a reducer 202 for transforming the reference light between the light source 200 and the reflection mirror 206, and an aperture plate 204 for irradiating light, which is passed through the reducer 202, onto the reflection mirror 206 through the aperture (not shown) thereof.

Figure 3:
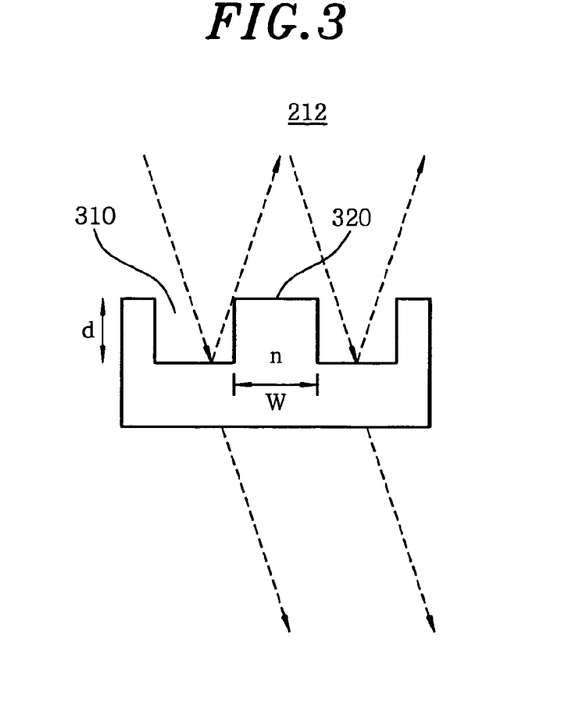
FIG. 3 is a view showing a diffraction grating provided in the pinhole of the pinhole plate shown in FIG. 2.

FIG. 3 illustrates the detailed structure of the diffraction grating 212 that is provided in the pinhole plate 210 shown in FIG. 2. As shown in FIG. 3, the diffraction grating 212 includes a groove 310 and a land 320 that have the same depth "d" and the same width "w", wherein the land 320 is placed at the center of the diffraction grating 212. The diffraction grating 212 has a size of a one-bit data corresponding to the track pitch of the storage medium 1. The groove 310 and the land 320 functions diffract and transmit the signal light provided from the objective lens 208 to produce 0th-order diffracted light, +1st-order diffracted light and −1st-order diffracted light. The diffraction grating 212 used in FIG. 2 is formed of a transmissive diffraction grating for transmitting light therethrough. Alternatively, a reflective diffraction grating for reflecting light therefrom can be used as in another embodiment of the present invention shown in FIG. 8.

The servo operation of the holographic ROM reader of the present invention shown in FIG. 2 is described below.

First of all, reference light generated by the light source 200 is incident on the reflection mirror 206 through the reducer 202 and the aperture plate 204. The reflection mirror 206 reflects the reference light of the phase-conjugate wave of the reference light to the storage medium 1 at an incident angle identical to that at which the reference light was incident at the time of recording on the storage medium 1.

The reference light incident on the storage medium 1 is diffracted by a recording material layer of the storage medium 1, to thereby become signal light carrying the track data of the storage medium 1. The signal light is then focused on the diffraction grating 212 embedded into the pinhole plate 210 by the objective lens 208. In this case, the diameter of the reference light incident on the storage medium 1 has a size of about 100 μm, so that the signal light focused by the objective lens 208 includes data reproduced from several tracks of the storage medium 1.

Figure 4:
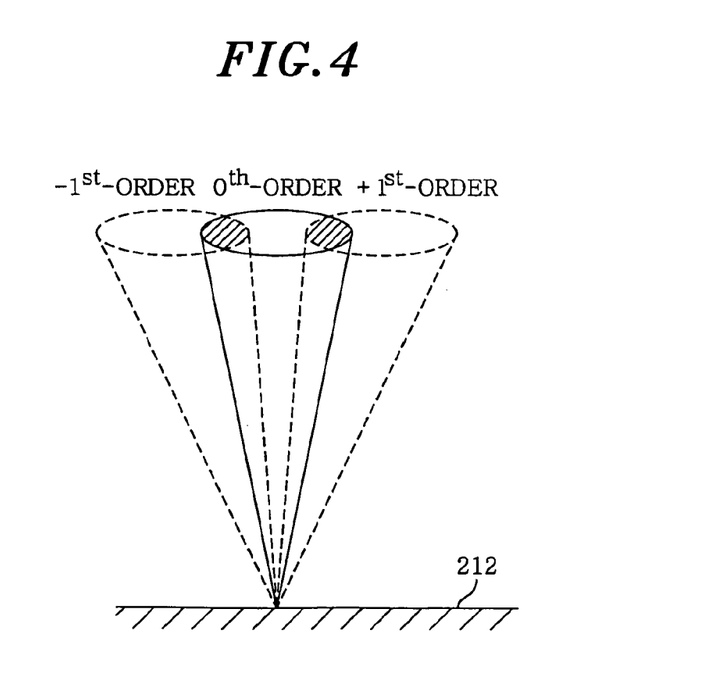
FIG. 4 is a view showing light diffracted by the diffraction grating shown in FIG. 3.

Thereafter, the groove 310 or the land 320 in the diffraction grating 212 diffracts the signal light provided from the objective lens 208 to produce 0th-order diffracted light, +1st-order diffracted light and −1st-order diffracted light therethrough, as shown in FIG. 4. The 0th-order diffracted light, +1st-order diffracted light and −1st-order diffracted light are condensed by the condenser lens 214 and are transmitted to the PDIC 216.

The PDIC 216 transmits the amounts of light, which are detected in the sensor areas A and B of the two-segmented photo diode, to the servo controller 100. The servo controller 100 determines whether the amounts of light detected by the sensor areas A and B are identical to each other. In detail, the servo controller 100 compares the amount of light of the overlap area of 0th- and +1st-order diffracted light with the amount of light of the overlap area of 0th- and −1st-order diffracted light. The servo controller 100 performs servo control to control the position of the pinhole plate 210 or the objective lens 208 so that the signal light passes through a center of the diffraction grating 212 if the amounts of light are not identical to each other. The principle of servo control is described with reference to FIG. 4 that shows light diffracted by the diffraction grating 212 of the holographic ROM reader according to the present invention.

As shown in FIG. 4, when the signal light is provided to the groove 310 or the land 320 in the diffraction grating 212, the groove 310 or the land 320 diffracts the signal light to produce 0th-order diffracted light, +1st-order diffracted light and −1st-order diffracted light according to diffraction angles. In more detail, the signal light incident on the diffraction grating 212 is divided into the 0th-order diffracted light in a geometrically optical transmission direction, and into the +1st- and −1st-order diffracted light that are spaced apart by certain angles with respect to the 0th-order diffracted light.

However, the signal light incident on the diffraction grating 212 is not a parallel wave but a spherical wave focused by the objective lens 208, so that, when the signal light is passed through the diffraction grating 212, the overlap area of the 0th-order diffracted light and +1st-order diffracted light and the overlap area of 0th-order diffracted light and the −1st-order diffracted light are produced, as shown in FIG. 4. If the signal light is exactly incident on the center of the groove 310 or the land 320 in the diffraction grating 212, the two overlap areas are symmetrical to each other, so that the amounts of light in the two overlap areas are identical to each other.

In the case of the transmissive diffraction grating 212 used in FIG. 2, the phase difference between diffracted light transmitted through the groove 310 and the land 320 is defined as Equation 1.

$$te^{i\phi} = te^{i[k(n-1)d]} = te^{i\left(\frac{2\pi(n-1)d}{\lambda}\right)} \quad (1)$$

where t is the transmissivity of the land, $te^{i\phi}$ is the transmissivity of the groove, n is a refractive index, and d is the depth of the groove.

A push-pull signal $I_{push-pull}$, that is, the difference between the signals $a_0$, $a_{+1}$, $a_{-1}$ of the 0th-order diffracted light, the +1st-order diffracted light and the −1st-order diffracted light, is expressed as Equation 2, which is then calculated as Equation 3. It can be understood from Equation 4 that the push-pull signal $I_{push-pull}$ is a sinusoidal function of a variable t in which the center of the incident light is offset from the center of the groove or the land.

$$I_{push-pull} \propto |a_0+a_{+1}|^2 - |a_0+a_{-1}|^2 \quad (2)$$

$$I_{push-pull} \propto Im(a_0 a^*)\sin\psi \quad (3)$$

In order to obtain the amplitude of the push-pull signal, the field amplitude of the 0th-order diffracted light $a_0$ and the field amplitude of the +1/−$1^{st}$ order diffracted light a in the diffraction grating having the transmissivity of Equation 1 or Equation 2 are calculated as Equations 4 and 5, $$a_0 = t + (te^{i\phi} - t)w/p \quad (4)$$

$$a^* = \frac{1}{\pi}(te^{-i\phi} - t)\sin(\pi nw/p) \quad (5)$$

Substituting Equations 4 and 5 for the corresponding terms of Equation 3 derives Equation 6.

$$Im(a_0 a^*) = -\frac{T}{\pi}\sin\phi\sin(\pi w/p) \quad (6)$$

In Equation 6, T is a transmissive coefficient, w is the width of the groove, and p is the pitch of the groove.

According to Equation 6, the conditions under which the sinusoidal function is at a maximum are expressed as Equations 7 and 8, $$\frac{\pi w}{p} = \frac{\pi}{2} \quad (7)$$

$$\phi = \frac{2\pi(n-1)d}{\lambda} = \frac{\pi}{2} \quad (8)$$

It can be understood from Equation 7 that the magnitude of the push-pull signal is at a maximum when the land and groove of the diffraction grating have the same width, that is, when w is p/2. Furthermore, it can be understood from Equation 8 that the magnitude of the push-pull signal is at a maximum when the diameter of the diffraction grating φ is π/2, that is, when the depth of the groove is λ/2.

Figure 5:
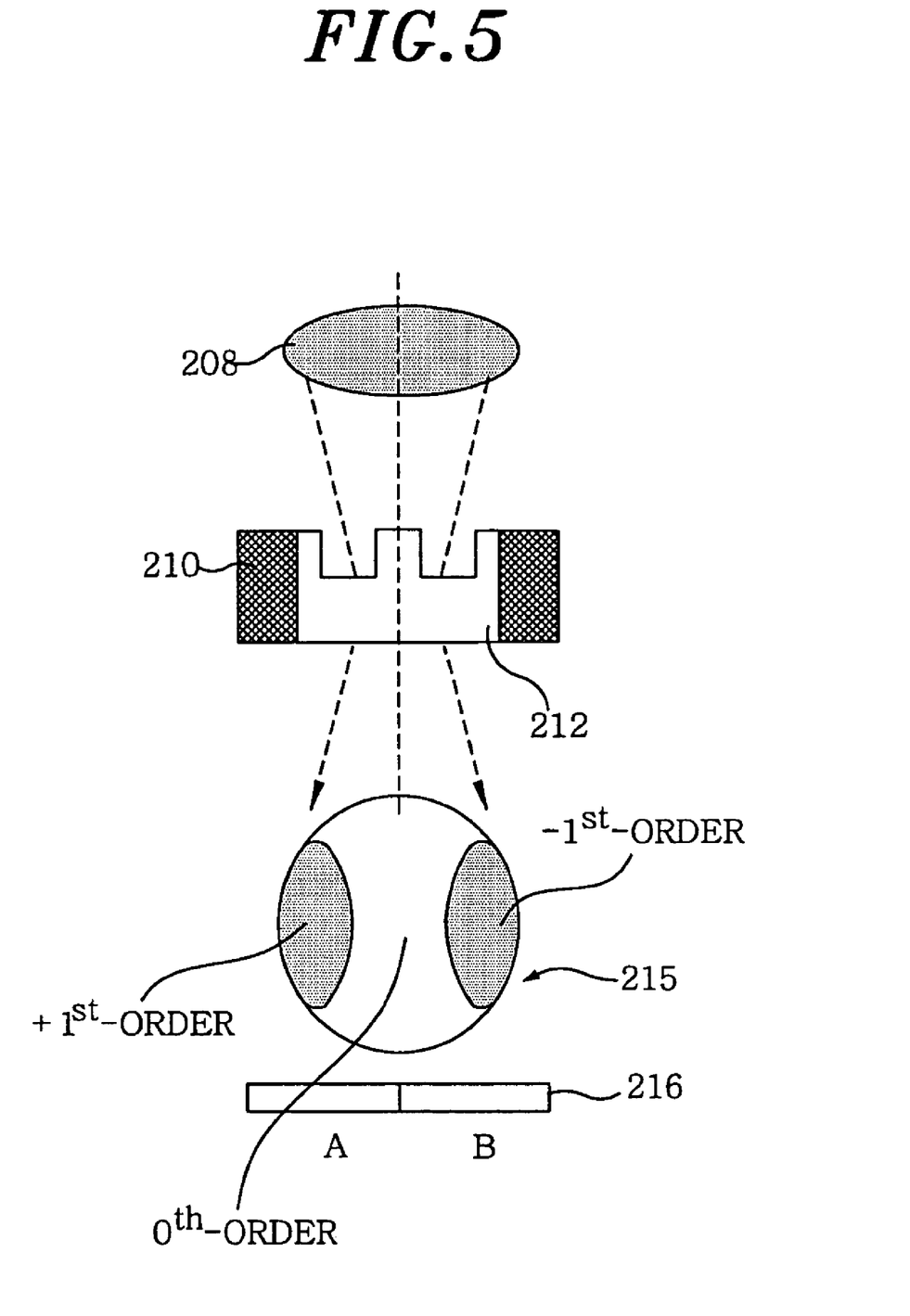
FIG. 5 is a view illustrating an example of the detection of light that is diffracted through the diffraction grating shown in FIG. 3.

FIG. 5 is a view illustrating an example of the detection of light that is diffracted through the diffraction grating 212 provided in the pinhole plate 210 of the holographic ROM reader according to the present invention.

As shown in FIG. 5, in the holographic ROM reader of the present invention, 0th-order diffracted light, $+1^{st}$ order diffracted light and $-1^{st}$ order diffracted light, which are diffracted by the diffraction grating 212, are detected by the PDIC 216. For example, in the case where the incident light is transmitted through the center of the land 320 or the groove 310 of the diffraction grating 212, the amounts of light, which are detected in the areas A and B of the photo sensor of the PDIC 216, are identical to each other, the overlap area of the $0^{th}$ order diffracted light and the +1st order diffracted light is identical to the overlap area of the $0^{th}$ order diffracted light and the $-1^{st}$ order diffracted light.

Figure 6A:
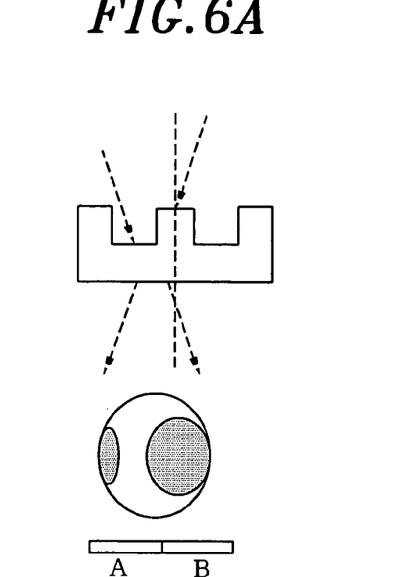
FIGS. 6A to 6C are views showing various examples of the detection of light in the holographic ROM reader according to the present invention.
Figure 6B:
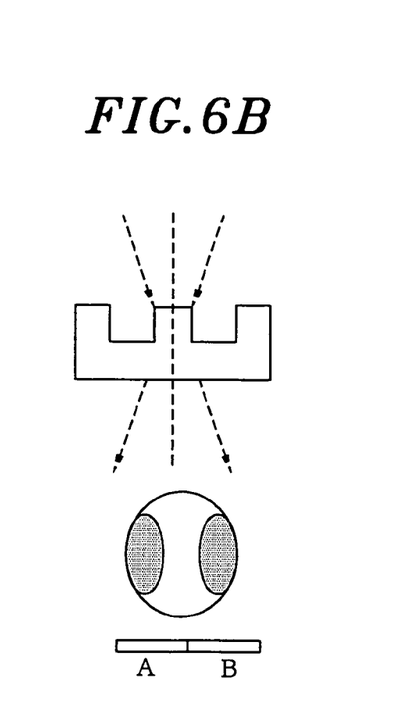
Figure 6C:
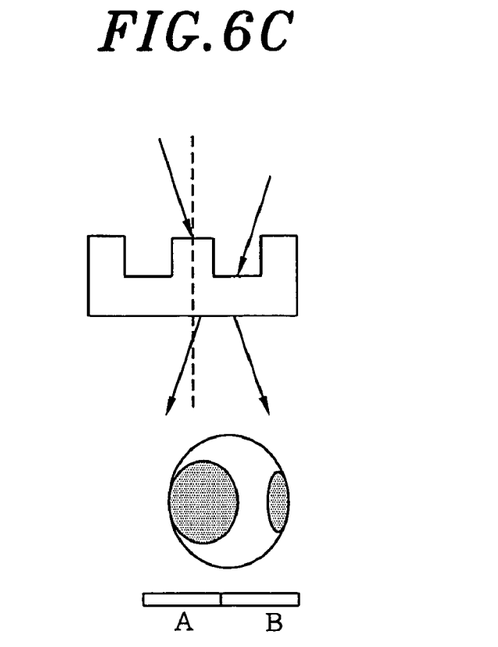

FIGS. 6A to 6C are views showing various examples of the detection of light in the holographic ROM reader according to the present invention.

As shown in FIG. 6A, when the incident light passes through the diffraction grating 212 while being offset from the center of the diffraction grating 212, the amounts of light detected in the two sensor areas A and B (that is, the amounts of light of the two overlap areas where the $0^{th}$ order diffracted light overlaps the +1st-order diffracted light and the $0^{th}$ order diffracted light overlaps the $-1^{st}$ order diffracted light) are asymmetric. That is, the amount of light detected in the sensor area B is larger than that detected by the sensor area A. In contrast, as shown in FIG. 6C, when the incident light passes through the side of the diffraction grating 212, the amount of light detected in the sensor area A is larger than that detected in the sensor area B.

Meanwhile, as shown in FIG. 6B, when the signal light passes through the center of the diffraction grating 212, the amount of light detected in the sensor area A is identical to the amount of light detected in the sensor area B.

Figure 7:
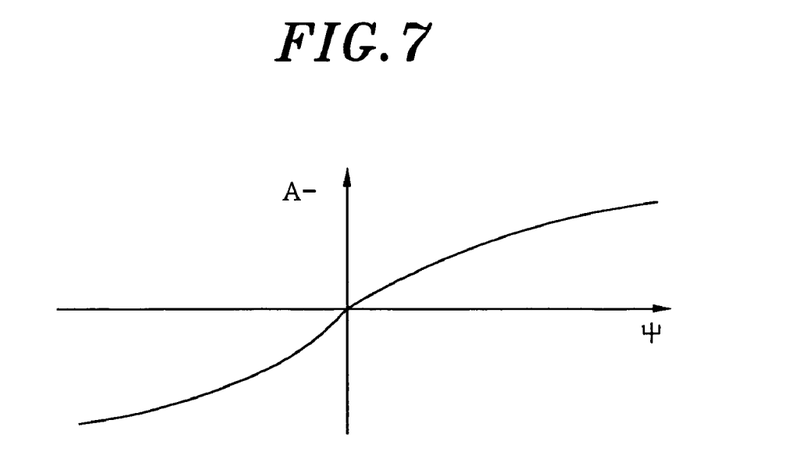
FIG. 7 is a graph showing the distribution of light that is detected by a photo detector when light passes through the center of the pinhole or when light passes through the side of the pinhole.

FIG. 7 is a graph showing the distribution of light that is detected by the PDIC 216 when the signal light passes through the center of the diffraction grating 212 and when the incident light passes through the side of the diffraction grating 212. As shown in FIG. 7, it can be understood that, if the incident light passes through the center of the diffraction grating 212, the distribution of light is plotted at an origin "0", whereas otherwise the distribution of light varies along a sinusoidal curve that increases or decreases from the origin.

Therefore, the servo controller 218 of holographic ROM reader according to the present invention controls the position of the objective lens 208 or the diffraction grating 212 so that the amount of light of the overlap area of the $0^{th}$ order diffracted light and the $+1^{st}$ order diffracted light is identical to the amount of light of the overlap area of the $0^{th}$ order diffracted light and the $-1^{st}$ order diffracted light.

Figure 8:
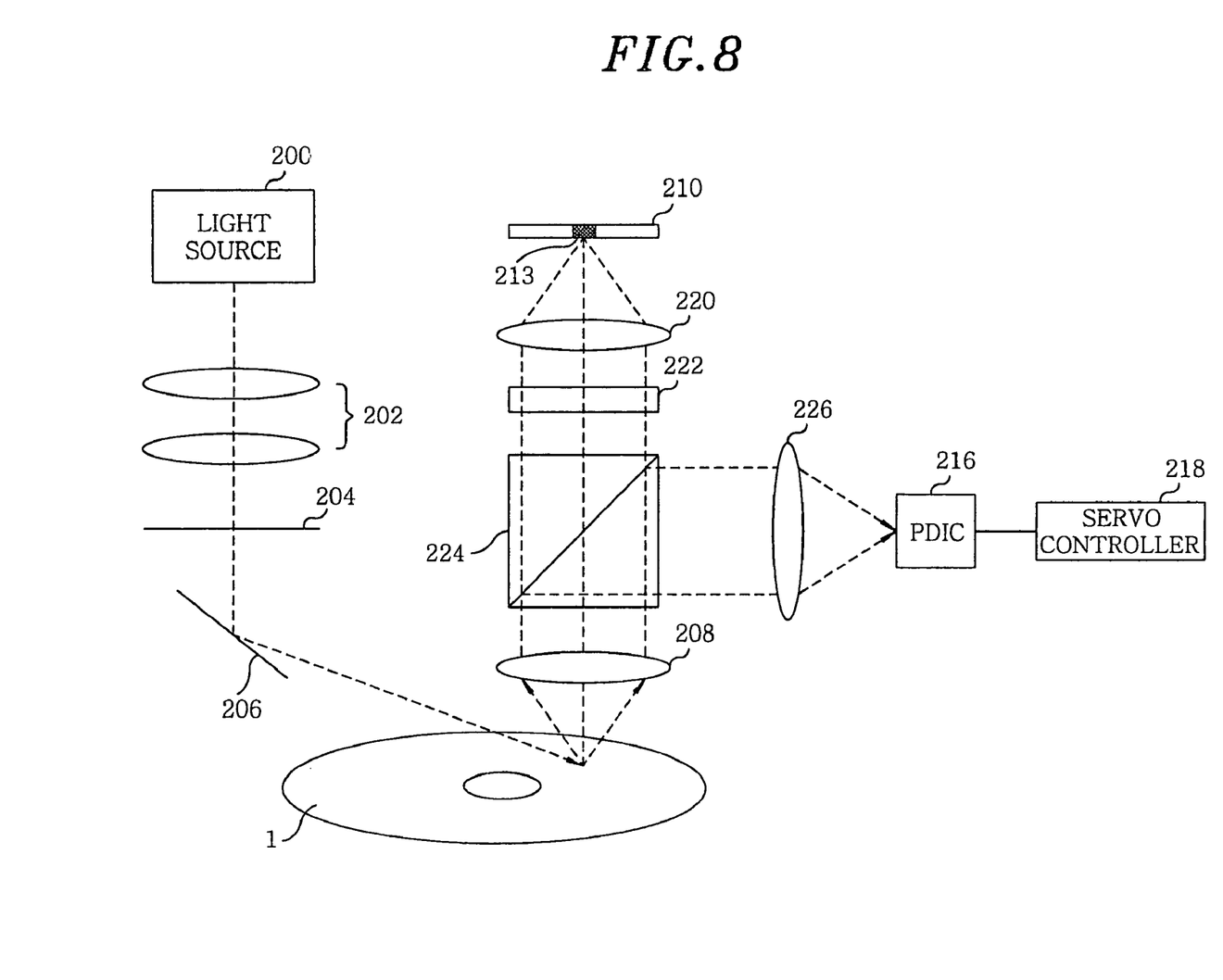
FIG. 8 is a view showing the configuration of a holographic ROM reader according to another embodiment of the present invention.

FIG. 8 is a view showing the configuration of a holographic ROM reader according to another embodiment of the present invention. Referring to FIG. 8, the holographic ROM reader according to another embodiment of the present invention includes a light source 200, a reflection mirror 206 for reflecting reference light, which is generated by the light source 200, to be incident on the storage medium 1 at a preset angle, a pinhole plate 210 having a pinhole through which only part of signal light (having a diameter corresponding to a one-bit data), which is reproduced from the storage medium 1a diffraction grating 213 embedded into the place of the pinhole of the pinhole plate 210, a parallel light lens 220 for transforming $0^{th}$ order diffracted light, $+1^{st}$ order diffracted light and $-1^{st}$ order diffracted light, which are diffracted by the diffraction grating 212 into parallel light, a λ/4 plate 222 for transforming the parallel light into λ/4 light, and a PDIC 216 for detecting the λ/4 light. The holographic ROM reader according to another embodiment of the present invention further includes a beam splitter 224 for reflecting the λ/4 light, a condenser lens 226 for condensing light, which reflected by the beam splitter 224 and for transmitting the light to the PDIC 216 and a servo controller 218 for performing servo control based on a detection result obtained through the PDIC 216.

The diffraction grating 213 provided in the pinhole plate 210 has a one-bit data size and includes a groove and a land that have the same depth d and the same width w, as in FIG. 3. In this case, the groove is placed on the center portion of the diffraction grating 213. The diffraction grating 213 used in FIG. 8 is formed of a reflective diffraction grating for reflecting light, which is different from a transmissive diffraction grating 212 used in FIG. 3.

As for the reflective diffraction grating used in FIG. 8, the phase difference between the diffracted light reflected by the groove and the land is defined as Equation 9.

$$re^{i\phi} = re^{i(k\cdot 2d)} = re^{i\left(\frac{4\pi d}{\lambda}\right)} \qquad (9)$$

where r is the reflectance of the land, $re^{i\phi}$ is the reflectance of the groove, n is a refractive index, and d is the depth of the groove.

In addition, for the reflective diffraction grating used in FIG. 8, Equations 2 to 8 as set forth above will be expressed as Equations 10 to 16 as below.

$$I_{push-pull} \propto |a_0 + a_{+1}|^2 - |a_0 + a_{-1}|^2 \qquad (10)$$

$$I_{push-pull} \propto \mathrm{Im}(a_0 a^*)\sin ta_{\pm 1} = ae^{\mp jt} \qquad (11)$$

$$a_0 = r + (re^{i\phi} - r)w/p \qquad (12)$$

$$a^* = \frac{q}{\pi}(re^{-i\phi} - r)\sin(\pi nw/p) \qquad (13)$$

$$\mathrm{Im}(a_0 a^*) = -\frac{R}{\pi}\sin\phi\sin(\pi w/p) \qquad (14)$$

where, R is a reflective coefficient, w is the width of the land, and p is the pitch of the land.

$$\frac{\pi w}{p} = \frac{\pi}{2} \qquad (15)$$

$$\phi = \frac{4\pi d}{\lambda} = \frac{\pi}{2} \qquad (16)$$

Further, it can be understood from Equation 15 that the magnitude of the push-pull signal is at a maximum when the land and groove of the diffraction grating have the same width, that is, when w is p/2 . Furthermore, it can be understood from Equation 16 that the magnitude of the push-pull signal is at a maximum when the diameter of the diffraction grating φ is π/2, that is, when the depth of the groove is λ/8.

The holographic ROM reader according to the present embodiment shown in FIG. 8 operates as follows. Reference light derived from the light source 200 is incident on the reflection mirror 206 through a reducer 202 and an aperture plate 204. The reflection mirror 206 reflects the reference light to the storage medium 1 at an incident angle identical to that at which light was incident at the time of recording on the storage medium.

The light incident on the storage medium 1 is diffracted from the storage medium 1 to produce signal light carrying the track data of the storage medium 1. The signal light is focused by the objective lens 208 and is incident on the diffraction grating 213 of the pinhole plate 210. The land 320 or the groove 310 in the diffraction grating 213 diffracts the signal light provided from the objective lens 208 to produce 0th-order diffracted light, $+1^{st}$ order diffracted light and $-1^{st}$ order diffracted light. And then, the $0^{th}$ order, $+1^{st}$ order and $-1^{st}$ order diffracted light are transferred into parallel light through the use of the parallel light lens 220. The parallel light is transformed into $\lambda/4$ light by the $\lambda/4$ plate 222 is reflected by the beam splitter 224 and then is transmitted to the PDIC 216 through the condenser lens 226.

The PDIC 216 transmits the amounts of light, which are detected in the sensor areas A and B of two-segmented photo diode, to the servo controller. The servo controller 218 determines whether the amount of light detected in the sensor area A is identical to the amount of light detected in the sensor area B. That is, the servo controller 218 compares the amount of light of the overlap area of the 0th diffracted light and the $+1^{st}$ diffracted light with the amount of light of the overlap area of the $0^{th}$ order diffracted light and the $-1^{st}$ order diffracted light. The servo controller performs servo control to control the position of the pinhole plate 212 or the objective lens 208 so that the signal light passes through a center of the reflective diffraction grating 213 if the amounts of light are not identical to each other.

As described above, in the present invention, the diffraction grating having the groove and the land is additionally embedded into the place of the pinhole of the pinhole plate of the holographic ROM reader, so that the PDIC can detect $0^{th}$ order diffracted light, $+1^{st}$ order diffracted light and $-1^{st}$ order diffracted light diffracted by the diffraction grating, thereby determining whether light has passed exactly through the center of the pinhole of the pinhole plate, and precisely performing servo control based on a determination result.

While the invention has been shown and described with reference to the preferred embodiments, it will be understood by those skilled in the art that various changes and modifications may be made without departing from the spirit and scope of the invention as defined in the following claims.

What is claimed is:

1. A holographic ROM reader comprising:
   an objective lens for focusing light irradiated on a storage medium from a light source and then diffracted by the storage medium;
   a pinhole plate provided with a pinhole having a size that allows part of the light, which is focused by the objective lens, to pass through the pinhole;
   a transmissive diffraction grating, embedded into the pinhole of the pinhole plate, for diffracting the light focused by the objective lens to produce $0^{th}$ order diffracted light, $+1^{st}$ order diffracted light and $-1^{st}$ order diffracted light therethrough;
   a photo detector for detecting the amounts of the $0^{th}$ order diffracted light, the $+1^{st}$ order diffracted light and the $-1^{st}$ order diffracted light; and
   a servo controller for comparing an amount of light of an overlapped area of the 0th-order diffracted light and the $+1^{st}$ order diffracted light with an amount of light of an overlapped area of the $0^{th}$ order diffracted light and the $-1^{st}$ order diffracted light, and performing servo control to pass the light through a center of the transmissive diffraction grating if the amounts of light are not identical to each other.

2. The holographic ROM reader of claim 1, wherein the transmissive diffraction grating has a land and a groove having the same width w and the same depth d, wherein the land is placed on the center portion of the diffraction grating and wherein the width w satisfies the following Equation, $w=p/2$, where $p$ is the pitch of the groove.

3. The holographic ROM reader of claim 2, wherein a depth d of the groove satisfies the following Equation, $d=\lambda/2$.

4. The holographic ROM reader of claim 2, wherein the servo controller controls a position of the objective lens so that light can pass through the center of the transmissive diffraction grating.

5. The holographic ROM reader of claim 2, wherein the servo controller controls a position of the pinhole plate so that the light can pass through the center of the transmissive diffraction grating.

6. A holographic ROM reader comprising:
   an objective lens for focusing light irradiated onto a storage medium from a light source and then diffracted by the storage medium;
   a pinhole plate provided with a pinhole having a size that allows part of the light, which is focused by the objective lens, to pass through the pinhole;
   a reflective diffraction grating, embedded into the pinhole of the pinhole plate, for diffracting the light that is focused by the objective lens to produce $0^{th}$ order diffracted light, $+1^{st}$ order diffracted light and $-1^{st}$ order diffracted light reflected therefrom;
   a photo detector for detecting the amounts of the $0^{th}$ order diffracted light, the $+1^{st}$ order diffracted light and the $-1^{st}$ order diffracted light; and
   a servo controller for comparing an amount of light of an overlapped area of the $0^{th}$ order diffracted light and the $+1^{st}$ order diffracted light with an amount of light of an overlapped area of the $0^{th}$ order diffracted light and the $-1^{st}$ order diffracted light, and performing servo control to pass the light through a center of the reflective diffraction grating if the amounts of light are not identical to each other.

7. The holographic ROM reader of claim 6, wherein the reflective diffraction grating has a land and a groove having the same width w and the same depth d, wherein the groove is placed on the center portion of the reflective diffraction grating and wherein the width w satisfies the following Equation, $w=p/2$, where $p$ is the pitch of the groove.

8. The holographic ROM reader of claim 7, wherein the depth of the groove satisfies the following Equation, $d=\lambda/8$.

9. The holographic ROM reader of claim 7, wherein the servo controller controls a position of the objective lens so that the light can pass through the center of the reflective diffraction grating.

10. The holographic ROM reader of claim 7, wherein the servo controller controls a position of the pinhole so that light can pass through the center of the reflective diffraction grating.

11. The holographic ROM reader of claim 6, further comprising:
   a parallel light lens for transforming the diffracted lights, which are reflected from the diffraction grating, into parallel light;
   a $\lambda/4$ plate for transforming the parallel light into $\lambda/4$ parallel light; and
   a condenser lens for condensing the $\lambda/4$ parallel light onto the photo detector.

* * * * *